Apr. 17, 1923.
C. J. FOSTER ET AL
1,452,150
FASTENER FOR VEHICLE CURTAINS
Filed March 22, 1922
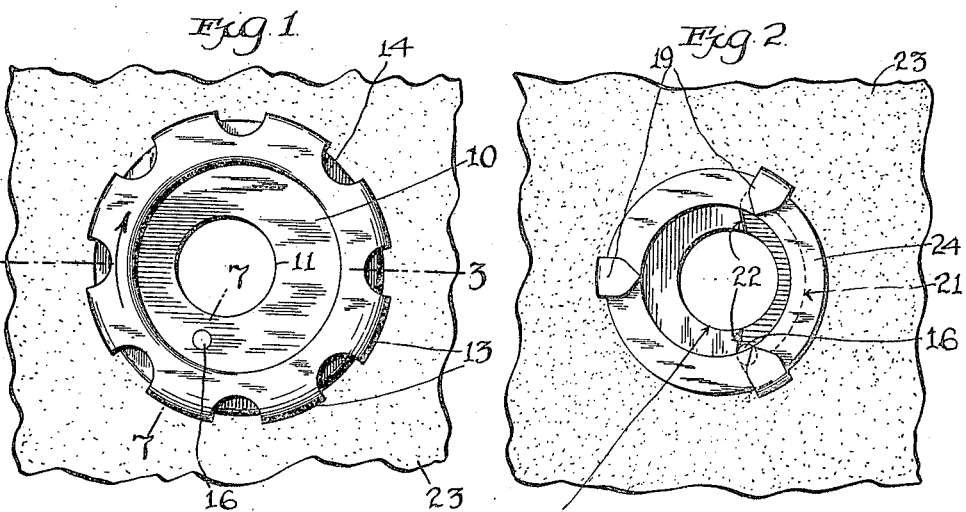
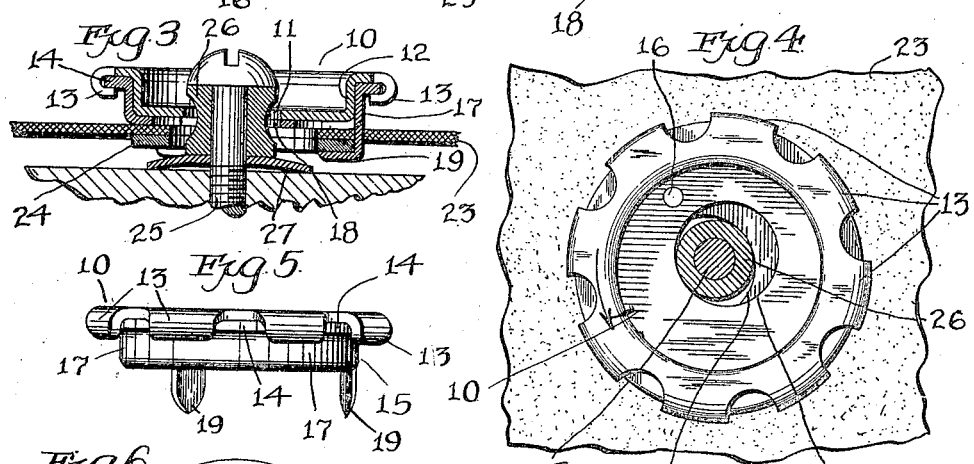
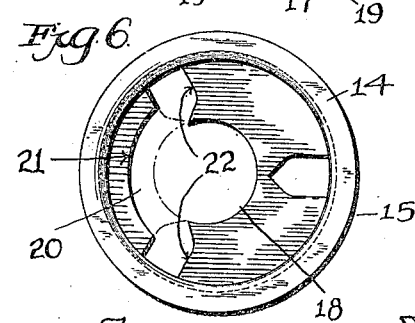
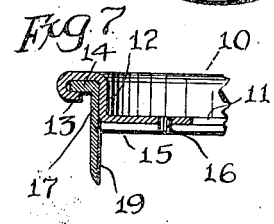
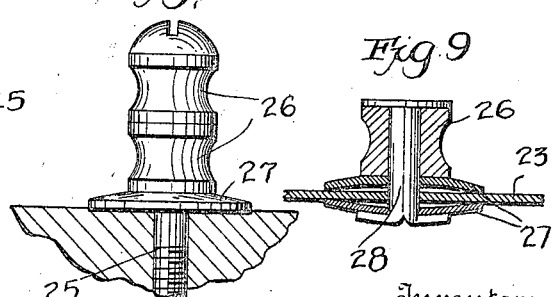
Inventors
Charles J. Foster
and Robert D. Simpson,
By their Attorney
J. M. Wilson Patented Apr. 17, 1923.

1,452,150

UNITED STATES PATENT OFFICE.

CHARLES J. FOSTER, OF HIGBY, AND ROBERT D. SIMPSON, OF COLUMBUS, OHIO.

FASTENER FOR VEHICLE CURTAINS.

Application filed March 22, 1922. Serial No. 547,349.

*To all whom it may concern:*

Be it known that we, CHARLES J. FOSTER and ROBERT D. SIMPSON, both citizens of the United States, and residing, respectively, at Higby, in the county of Ross, State of Ohio, and Columbus, in the county of Franklin, State of Ohio, have invented a new and useful Fastener for Vehicle Curtains, of which the following is a specification.

Our invention relates to devices intended to be used in attaching curtains or the like to the frame work or bows of a vehicle and is especially adapted for this purpose in connection with automobiles. It may also be utilized to fasten curtains together when this is desired.

We have endeavored in our invention to provide a device of simplified construction which can be manufactured economically, attached to its proper location easily and which will have sufficient strength when in use to withstand the strains and shocks to which it is necessarily subjected.

It is also very easy to operate and can be locked in position or released with one hand, which, as is obvious, is frequently a great advantage. It also will hold the curtains tightly in place on the frame or bows of the vehicle thereby preventing any flapping back and forth or noisy rattling on the securing member.

These and other advantages are set forth in the following specification and accompanying drawings in which a preferred embodiment of our invention is described and shown.

Fig. 1 is a top plan view showing the invention attached to a curtain.

Fig. 2 is a bottom plan view of the same.

Fig. 3 is a sectional view on the line 3—3 of Fig. 1.

Fig. 4 is a view similar to Fig. 1 showing the fastener locked on a post.

Fig. 5 is a side elevation of the fastener before attachment to the curtain.

Fig. 6 is a top plan view of the fixed member of the fastener.

Fig. 7 is a fragmentary sectional view on the line 7—7 of Fig. 1.

Fig. 8 is a view showing a double post attached to the frame or bow of the vehicle.

Fig. 9 is a sectional view showing the means of attaching a post to a curtain.

As shown in the drawings the device consists of a shallow cup-like rotatable member 10 with an opening 11 off the center thereof and a flange 12 provided on its periphery with a number of prongs 13 adapted to be bent over and to grip the shoulder 14 of a fixed or stationary member 15, thereby securing together the members 10 and 15 in such a way that the member 10 may be rotated on the member 15 but cannot be removed therefrom without straightening out the prongs 13. On the bottom of the rotatable member 10 a stop 16 projects downwardly to limit the movement of the said member 10 so that the holes in the two disks 10 and 15 register perfectly. As shown herewith it consists of a pin sweated on the movable disk member 10.

The fixed disk member 15 consists of a flat table portion with a right angular peripheral flange 17 and a second right angular flange 14. In the flat portion we provide an opening 18 similar to that in the member 10 and the tangs 19 are punched from this said disk portion also. These tangs are forced through the curtain 23 and bent over the washer 24 thereby securing the fastener to the curtain.

Between two of the openings formed by the positioning of these tangs the part 20 is punched out leaving a radial guide way 21 in which the pin 16 moves, the two outer edges 22—22 forming shoulders which act as stops to limit the movement of the pin 16 and prevent the member 10 from making a complete revolution.

The post which may be attached to the bows or body of the vehicle or used to secure two or more curtains together consists of a screw 25 on which may be mounted one or more members or sections 26 made with curved concave sides held in position between the washer 27 and the head of the screw 25. One of these sections may be used for each curtain secured on the post.

When the hole in the washer 27 is punched a small part of the metal immediately around the opening is pressed down so that when the screw enters the said opening the thread thereof engages with the said depressed metal.

With this form of post it is practical to use one or more of the sections 26, and screws of the proper length for the desired number of sections can be furnished as required.

In actual operation, with our fastener in the position shown in Fig. 1, the two openings 11 and 18 are placed over the post and the movable member is then turned in the direction of the arrow. As the two openings 11 and 18 are off centre the rotation of the movable member 10 will bring about the positions shown in Fig. 4 and the fastener will be securely locked to the post.

When it is desired to release the fastener the movable member 10 is turned in the direction of the arrow in Fig. 4 and when the openings 11 and 18 register the fastener can be easily removed from the post.

We claim:—

1. In a device of the character described the combination of the following elements: a post adapted to be attached to a vehicle and provided with sections adapted to receive a fastener, and a fastener adapted to engage with said post and comprising means for attachment to a vehicle curtain, a fixed disk member, a disk member adapted to rotatably move on said fixed member, openings in said fixed and rotatable disk member, said openings being adapted when in register to receive the said post and when out of register to cause the said fixed and rotatable disk members to lock securely on the said post.

2. In a device of the character described, the combination of a post adapted to be attached to a vehicle; and provided with sections adapted to receive a fastener; with a fastener adapted to be attached to a vehicle curtain and comprising a fixed disk member having means for attachment to said curtain, a rotatable disk member provided with means for rotatable engagement with the said fixed member and openings in the said fixed and rotatable members so disposed with relation to one another that when the said openings are in register the said post may enter or be withdrawn from the said openings, and when out of register to diminish the diameter of the aperture formed by the walls of the two said openings in the said fixed and rotatable disk members.

3. In a device of the character described, the combination of the following elements; a post adapted to be attached to a vehicle and provided with sections adapted to receive a fastener; and a fastener adapted to engage with said post and comprising a fixed disk member having means for attachment to a vehicle curtain, a peripheral annular flange on its upper surface and a radial guide way inside the said annular flange; and a second disk member provided with means for engagement with the said fixed disk member consisting of prongs adapted to be bent over the annular flange thereon, a stop adapted to move in the said radial guide way in the said fixed member, and circular openings in the said disk members so disposed with relation to one another that when the said openings are in register the said post may enter the said openings and upon rotation of the said second disk member the said fastener is securely locked to the said post.

CHARLES J. FOSTER.
ROBERT D. SIMPSON.

Witnesses:
J. D. WITHGOTT,
N. S. McDONELL.